United States Patent
Krause et al.

(10) Patent No.: US 6,891,877 B2
(45) Date of Patent: May 10, 2005

(54) MODULE OF A SOLID-STATE PLATELET LIGHT-PUMPED LASER

(75) Inventors: Ulf Krause, Jena (DE); Artur Afanaslovich Mak, St. Petersburg (RU); Boris Grigorievich Malinin, St. Petersburg (RU); Valeriy Mikhaylovich Mitkin, St. Petersburg (RU); Vladimir Georgievich Pankov, St. Petersburg (RU); Victor Anatollevich Serebryakov, St. Petersburg (RU); Vladimir Ivanovich Ustyugov, St. Petersburg (RU); Bernd Braun, Jena (DE)

(73) Assignee: Jenoptik Laser, Optik, System GmbH, Jena (DE)

( * ) Notice: Subject to any disclaimer, the term of this patent is extended or adjusted under 35 U.S.C. 154(b) by 0 days.

(21) Appl. No.: 10/332,753

(22) PCT Filed: Jul. 10, 2001

(86) PCT No.: PCT/RU01/00278

§ 371 (c)(1),
(2), (4) Date: Oct. 14, 2003

(87) PCT Pub. No.: WO02/05393

PCT Pub. Date: Jan. 17, 2002

(65) Prior Publication Data

US 2004/0052284 A1 Mar. 18, 2004

(30) Foreign Application Priority Data

Jul. 13, 2000 (RU) .......................................... 2000118426

(51) Int. Cl.[7] .............................. H01S 3/04; H01S 3/14; H01S 5/00; H01S 3/06; H01S 3/08

(52) U.S. Cl. .............................. 372/70; 372/34; 372/35; 372/36; 372/39; 372/49; 372/66; 372/92; 372/99

(58) Field of Search ................................. 372/9, 29.022, 372/34, 35, 36, 39, 47, 49, 53, 54, 66, 69, 70, 92, 99

(56) References Cited

U.S. PATENT DOCUMENTS

5,949,805 A  9/1999  Mordaunt et al. ............ 372/34

FOREIGN PATENT DOCUMENTS

EP  0831567  3/1998

*Primary Examiner*—Minsun Oh Harvey
*Assistant Examiner*—Armando Rodriguez
(74) *Attorney, Agent, or Firm*—Patterson, Thuente, Skaar & Christensen, P.A.

(57) ABSTRACT

The inventive module of a light-pumped laser comprises light pump sources, a solid-state active element which is embodied in the form of a plate and provided with a couple of first opposite side faces, the distance therebetween defining the width of the active element for passing a pump radiation therethrough from the pump sources to the active element; a couple of second opposite side faces. The distance therebetween defining the thickness of the active element. which faces are embodied in the plane-parallel manner in order to direct a beam of formed laser radiation in such a way that it enables said beam to pass along the length of the active element in a zigzag manner, undergoing a total internal reflection from the couple of second side faces; a couple of end faces, the distance therebetween defining the length of the active element, and also heal-spreading devices which have a thermal contact with each second face in order So remove beat from the active element.

20 Claims, 4 Drawing Sheets

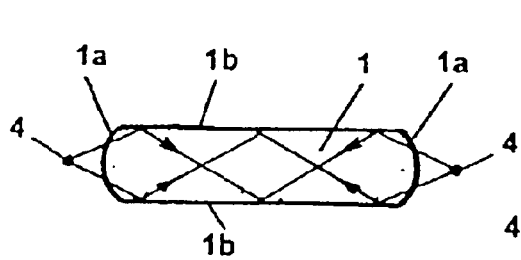
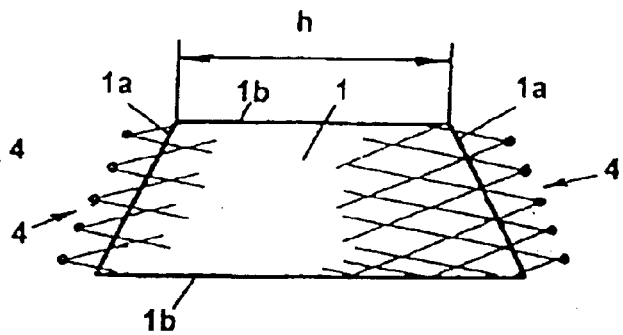
FIG. 3a  FIG. 4
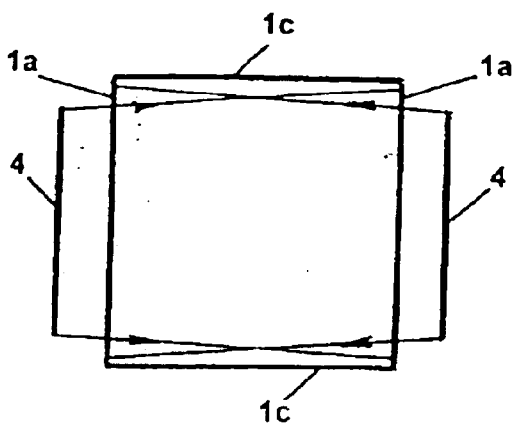
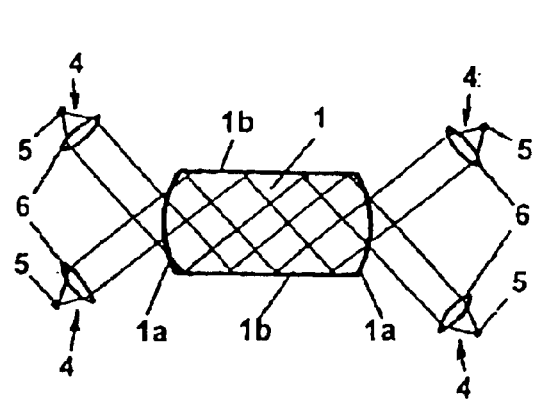
FIG. 3b  FIG. 5
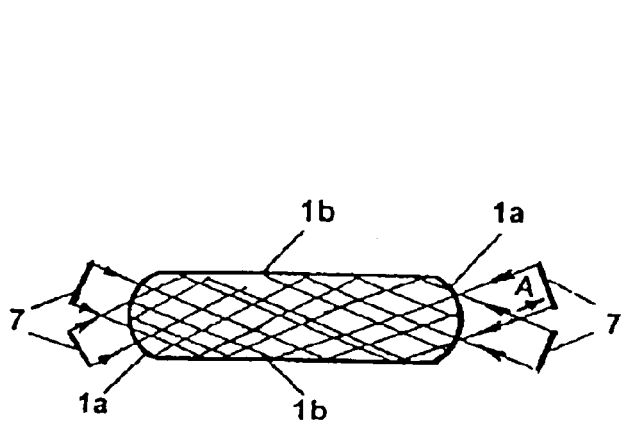
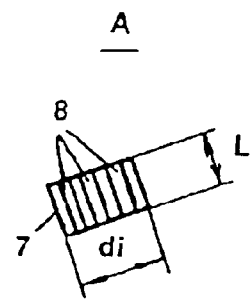
FIG. 6a  FIG. 6b

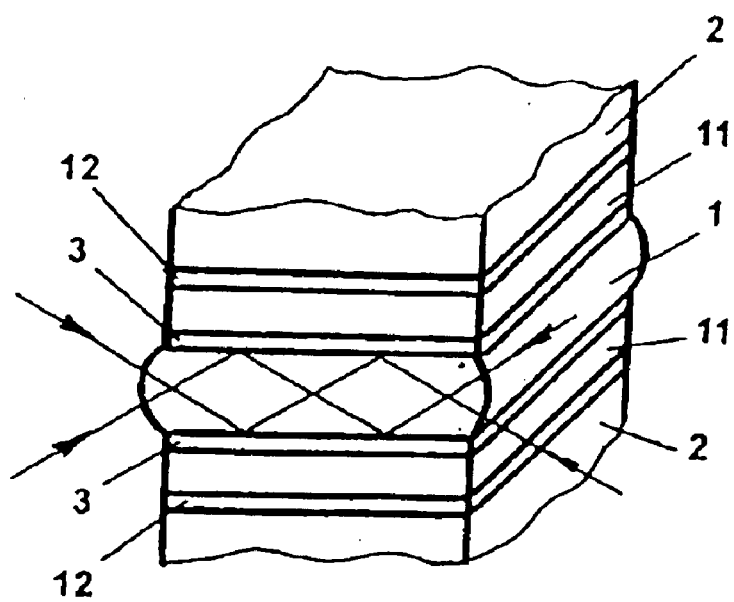
FIG. 9
FIG. 10a  FIG. 10b

MODULE OF A SOLID-STATE PLATELET LIGHT-PUMPED LASER

TECHNICAL FIELD

The present invention relates to the area of laser techniques and can be used in quantum electronics and optical-mechanical industry when developing and fabricating laser devices with increased radiation power for medical, technological and other applications.

BACKGROUND ART

Modules of optically pumped solid-state slab lasers usually comprise sources for optical pumping and a gain element in a form of an elongated slab made in a plane-parallel form with two opposite lateral faces for direction of an output laser beam so that it propagates along the slab length in a zigzag path, undergoing total internal reflections at the two lateral faces. Usually radiation from the sources for optical pumping is introduced into the laser slab through the same lateral faces. Since the operation of high power solid-state lasers needs significant heat removal from the laser slab, cooling of the slab in such devices can be realized by liquid cooling of the same lateral faces through which pump radiation is applied. In such modules both lasers diodes and pump lamps are used as pump sources.

If in a laser module the same lateral faces through which pump radiation is applied are used for cooling of the laser slab then in the path of pump radiation there are found to be optical windows, flows of cooling fluids, antireflection coatings on window surfaces and protective coatings of the laser slab, which all result in inevitable energy losses and thereby in a decrease of pump efficiency and laser output power. Further, high requirements to optical, thermomechanical, thermophysical and beam parameters exist for the materials to be used for the optical windows and coatings in such devices. These requirements essentially limit the possibility of choice of materials and techniques and complicates the fabrication of a laser module.

These problems are addressed by laser modules with different tasks of the lateral faces of the laser slab, where heat is removed from the same pair of the opposite lateral faces which are used for waveguide propagation of a laser beam and where optical pumping is realized through another pair of opposite lateral faces. This technical solution strongly reduces the number of requirements to parameters of cooling media and coatings, and allows to use of conduction cooling of the laser slab in order to miniaturize of the entire device. Thus, an optically pumped laser module as described in U.S. Pat. No. 5,949,805 comprises the sources for optical pumping and a solid-state laser slab having a pair of first opposite lateral faces which are adapted to supply pump radiation from the pumping sources through them into the laser slab and which are spaced at a distance defining a width of the laser slab and a pair of second opposite lateral faces which are plane-parallel for direction of an outputted laser beam so that it propagates along the slab length in a zigzag path while undergoing total internal reflections at the second lateral faces, and which second lateral faces are spaced at a distance defining a thickness of the laser slab and with the slab further having a pair of end faces with the distance between them defining the length of the laser slab. This module also comprises heat-removing portion, being in thermal contact with each of the second lateral faces in order to remove heat from the laser slab. The thermal contact between the laser slab and the surfaces of heat-removing portion is achieved in U.S. Pat. No. 5,949,805 by means of a two-layer coating including a transparent layer of silicon dioxide with a thickness of 2 $\mu$m at the surface of the laser slab and a following adhesive layer with a thickness of 2–6 $\mu$m. The first layer guarantees waveguide propagation of the beam with small losses and further protects the surface of the laser slab from harmful influences of the second layer material. The second layer guarantees attachment of the slab unit to the means for removing heat.

Absorption of pump radiation by the laser slab causes heating of the slab. In case of a uniform illumination of the laser slab volume by pump radiation, of a uniform heat removal from the corresponding pair of opposite lateral faces and of absence of fringe heat effects (here and hereafter fringe heat effects shall refer to effects being caused by the opposite lateral faces of a laser slab having at least partially no contact with the heat removing portion), the temperature distribution along the thickness of the laser slab has a parabolic form with a temperature maximum in the middle of the laser slab. Due to dependence of the refractive index of the laser slab material from temperature, the distribution of the refractive index along the slab thickness obtains a similar form close to the parabolic one.

However, the laser module described in U.S. Pat. No. 5,949,805 uses a laser slab with a cross-section close to square (that is, width and thickness of the laser slab have almost the same dimensions). Since the width of fringe area of a laser slab where the above mentioned fringe heat effects take place is in first approximation the same order as the slab thickness in the well-known laser modules the area of fringe heat effect occupies a significant part of the cross-section of the laser slab. A distribution of the refractive index, which appears as a result of fringe effects, having remarkable components of higher orders than the second one, has an impact on the output laser beam which hardly can be corrected by means of sufficiently simple external optical systems. As a result, the laser beam generated by the known module has an increased divergence.

Pump power in the known laser module is delivered to the laser slab perpendicular to the first lateral faces in light beams emitted from the pump sources, which are located directly opposite the lateral faces. This pump radiation must be sufficiently uniformly distributed over the volume of the laser slab in order to increase pump efficiency and to prevent local heat overloads, which result in decreased maximum dissipated power, as well as in increased output laser beam divergence due to laser slab surface deformations. However the light beams shaped by known pump sources are characterized by a significant spatial non-uniformity of radiation intensity distribution. So, to provide uniformity of pump radiation distribution over the volume of the laser slab, the surfaces of the lateral faces through which pump radiation passes, are roughened in known laser modules. However such rough light-diffusing surface reflects (back scatters) an appreciable part of pump radiation. This negatively affects pump efficiency. Further, irregularities at the surface of the lateral faces can cause a laser slab damage when tension forces which appear in consequence of temperature variations inside the laser slab in operation arise. This limits maximum power, dissipated into the laser slab, and hence limits the laser output power.

Additionally, when irradiating the surfaces of the lateral faces with pump light in transverse direction a large part of pump energy after having transversed the lateral faces will continue to propagate in the same direction or close to it in spite of pumping light diffusion at the rough surface. A certain fraction of this energy, which is not absorbed by doping material, passes through the laser slab and is irreversibly lost. This further reduces efficiency of the pumping, particularly for a laser slab with a dopant of low concentration and small stimulated emission cross-section σ. To increase the lateral faces roughness allows some reduction of such losses, due to stronger diffusion of the pump light into a wider angle range that lengthens the pump light in the laser slab medium, however simultaneously results in increased pump energy losses due to reflections at the rough surfaces of the lateral faces.

DISCLOSURE OF THE INVENTION

It is an object of the invention to provide an optically pumped slab laser module, with decreased output laser radiation divergence, increased pump efficiency and raised thermal strength of the laser slab, thereby ensuring more powerful and bright laser radiation output.

This object is achieved by an optically pumped laser module comprising: sources for optical pumping, a pair of end faces with the distance between them defining the length of the slab solid-state gain element in form of a slab having a pair of first opposite lateral faces adapted to deliver pump radiation through them from the pumping sources into the laser medium and which are spaced at a distance defining a width of the slab, a pair of second opposite lateral faces which are plane-parallel for direction of a laser beam to be output such so that the beam propagates along the slab length in a zigzag path, undergoing total internal reflections at the second lateral faces and with the distance between the second lateral faces defining a thickness of the slab, and heat-removing portion being in a heat contact with each of the second lateral faces for heat removal from the slab, wherein the width of the slab exceeds its thickness, the first lateral faces are transparent for pump radiation, and the location of the sources for optical pumping relative to the slab as well as the angular emission characteristics of the sources for optical pumping are so that at least a major part of pump radiation propagates inside the laser slab along the width of the slab in a zigzag path while being totally internal reflected at the second lateral faces.

When the slab width exceeds the thickness of the slab it becomes possible to provide in the middle part of the laser slab a nearly uniform distribution of pump radiation over the slab thickness, without a need to use rough diffusing lateral faces, as in known laser modules, but by delivery of pump radiation through the transparent first lateral (edge) faces at prearranged angles (defined by the location of the pumping sources and their angular emission characteristics) and by further propagation of the entire pumping radiation or at least of a major part thereof inside the laser slab in a zigzag path with total internal reflections at the second lateral faces. During such zigzag propagation of the pump light in the middle part of the laser slab an efficient "intermixing" of reflected beams of pump radiation takes place, and, as a result, an area with sufficiently uniform distribution of pump radiation along the thickness direction of the slab is formed. Such uniform distribution is provided as a result of multiple reflections which, in turn, become possible due to comparatively large size of the slab with propagation of pump radiation at its comparatively small thickness. If the first lateral faces of the laser slab are transparent to pump radiation instead of light-diffusing as in known laser modules, one can increase the part of pump radiation depositing energy inside the laser slab, and thereby increase pump efficiency and, hence, module output power.

Preferably, the width of the laser slab exceeds the thickness of the slab at least 4 times.

Since, as it was noted above, fringe heat effects affecting the temperature distribution in the laser slab exist only in a fringe area of the laser slab, which area has a size not exceeding the thickness of the slab, then the mentioned fringe effects are practically negligible at the most part of the cross section of the laser slab (in its middle part), when the thickness of a slab is at least 4 times less the width, unlike in known laser module, where fringe effects exist at the most part of cross-section of the laser slab in consequence of the nearly square form of the cross-section of the slab.

It is obvious, that when pump radiation enters into the laser slab in such a way as it is suggested in the present invention, in fringe parts of the laser slab near the first lateral faces where the pump light did not yet "intermix" in sufficient degree by means of total internal reflections at the second lateral faces, there can exist some areas with illumination which is non-uniform. Over the thickness of the laser slab. It is obvious as well that in the laser module described in U.S. Pat. No. 5,949,805, due to a nearly square cross-section profile of the laser slab, when pump radiation enters, as suggested in the present invention, namely at given angles through the transparent first lateral faces, areas with non-uniform illumination would occupy the most part of the slab cross section since the critical angle of total internal reflection in usually used laser slabs is about 40–50° (the exact value is defined by the relation between refraction indexes of the laser slab material and the medium contacting the slabs at its second lateral face). However in the suggested module, due to the ratio between the width of the laser slab and the thickness of the laser slab being preferably not less than 4:1, areas with non-uniform illumination occupy comparatively small parts of the cross section of the slab close to the first lateral faces, but most of the cross section of the laser slab in its middle part, namely, where the absence of fringe effect is provided at the above mentioned ratio between width and thickness, the distribution of pump radiation in the laser slab will be uniform in thickness direction to a large extent. Uniform distribution of pump radiation prevents arising of the local heat overloads, which could result in deformation of the laser slab surfaces, that abruptly degrades angular divergence of an output laser radiation.

Due to the absence of fringe heat effects and uniform distribution of pump radiation along the slab thickness, distribution of temperature in the middle part of the laser slab in the thickness direction of the laser slab will have a bell-shaped profile close to a parabolic one when the heat is removed from the second lateral faces. As noted above, such temperature distribution curve being close to parabolic without higher order components enables to output a laser beam, which has a low angular divergence.

Further, a zigzag propagation of the most part of the pump radiation inside the laser slab provides to increase the path length for the most part of radiation in the laser slab over paths with direct passing. Due to this reason losses of pump radiation, connected with a direct passing through the laser slab, decrease. This also provides for an increased pump efficiency and allows to use gain media with dopants in lowered concentration and with smaller cross-section for stimulated emission.

The sources for optical pumping can be made so that they provide a light beam which converges or diverges in a plane perpendicular to the first and the second lateral faces so that at least a major part of this beam passes through the first lateral (edge) faces and incides inside the slab onto the second lateral faces at an angle sufficient for total internal reflection (i.e. exceeding the critical angle counted from the normal to the surfaces).

The sources for optical pumping can be oriented so that the axial plane of the light beam shaped by the pumping source inside the slab will be directed to the corresponding second lateral face at the angle of total internal reflection. This allows to provide a zigzag propagation of the entire pump radiation inside the laser slab as well as to enlarge the number of optical pumping sources, which can be placed near each of the first lateral faces. Zigzag propagation of the entire pump radiation minimizes losses of pump radiation which are connected with a direct pass through the laser slab, and increases of the possible number of pump sources which allows for a perfect uniformity of pump radiation distribution along the thickness direction of the laser slab and for a raise of the total pump power which in turn provides for an increased laser radiation output power.

The first lateral faces of the laser slab can be made in the form of convex surfaces formed by parts of the rotation cylinders whose generatrix passes along the length of the laser slab, or in the form of flat surfaces tilted towards each other and relatively to the normal of the plane of the second lateral faces, preferably at an angle less than 45°. Such realization of the first lateral edge faces prevents excitation of parasitic modes which would arise from appearance of closed beam trajectories in the cross section of the laser slab and would result in abrupt reduction of the laser module output power.

As an alternative to prevent excitations of parasitic modes, there is placed an optical component which is transparent to pump radiation and which is in contact with the surface of the corresponding first lateral face through an immersion element between each of the optical pumping sources and the appropriate first lateral face of the laser slab. Such optical component or extension as well as the immersion element may be constructed of material that is absorbing at the wavelength of specified laser radiation and is, thus, sufficient for suppression of parasitic modes in the laser slab.

The sources for optical pumping are preferably realized as laser diode pump sources.

A laser diode pump source can comprise at least one laser diode bar oriented along the length of the laser slab, or at least one row of laser diode bars oriented transverse to the length of the laser slab.

Further, each of the laser diode pump sources can be equipped by an optical system adapted to match the emitting aperture of the laser diode pump source to the size of the corresponding first lateral edge face, and to shape the required angular characteristics of the pump radiation.

In a preferable embodiment of the invention an intermediate layer material which is optically uniform and transparent to both output laser radiation and pump radiation, and which is further plastic and heat-conducting, is located between the second lateral faces of the laser slab and corresponding heat removing portion with the refractive index of the material being less than the refractive index of the laser slab material, and with a thickness of the material not exceeding $0.25(K_l/K)d$, where $K_l$ and $K$ are thermal conductivities of the intermediate layer material and the material of the laser slab, respectively, and d is the thickness of the slab. At such thickness of the intermediate layer the temperature drop inside the layer does not exceed the temperature variation inside the laser slab which condition characterizes sufficient and efficient heat removal. The intermediate layer can be made from thermoplastic polymer on a base of hetero-organic compounds and complex ethers. Using one intermediate layer instead of two layers simplifies the laser module fabrication in comparison with the module known from U.S. Pat. No. 5,949,805.

Between the intermediate heat-conducting layer and the heat removing portion additionally a plate having plane-parallel opposite surfaces can be placed. The first of the surfaces is in contact with the intermediate heat-conducting layer, and the second surface is coated with an additional intermediate heat-conducting layer being in contact with the heat removing portion. Use of such plate reduces the micro-nonconformities of temperature distribution along the surface of the laser slab and thereby perfects the angular emission characteristics of the output laser beam.

BRIEF DESCRIPTION OF THE DRAWINGS

FIG. 3a shows a further arrangement of laser diode pump sources without shaping optics in a view from the end face of the laser slab;

FIG. 3b gives a view of the unit shown in FIG. 3a as viewed from the wide lateral face of the laser slab;

FIG. 4 illustrates a further arrangement of the laser diode pumping sources without shaping optics in a view from the end face of the laser slab;

FIG. 5 shows a further arrangement of the laser diode pump sources with shaping optics in a view from the end face of the laser slab;

FIG. 6a demonstrates a further variant of location of the laser diode pump sources without shaping optics in a view from the end face of the laser slabs;

FIG. 6b shows a laser diode stack (the view A in FIG. 6a);

FIG. 9 shows a variant of design of the module using additional plates for leveling of micro-non-uniformity of temperature distribution over the surface of the laser slab; and FIGS. 10a and 10b display a far field view of slab laser output for the variants of design without additional plates and with additional plates, respectively.

BEST MODES OF CARRYING OUT THE INVENTION

Figure 1:
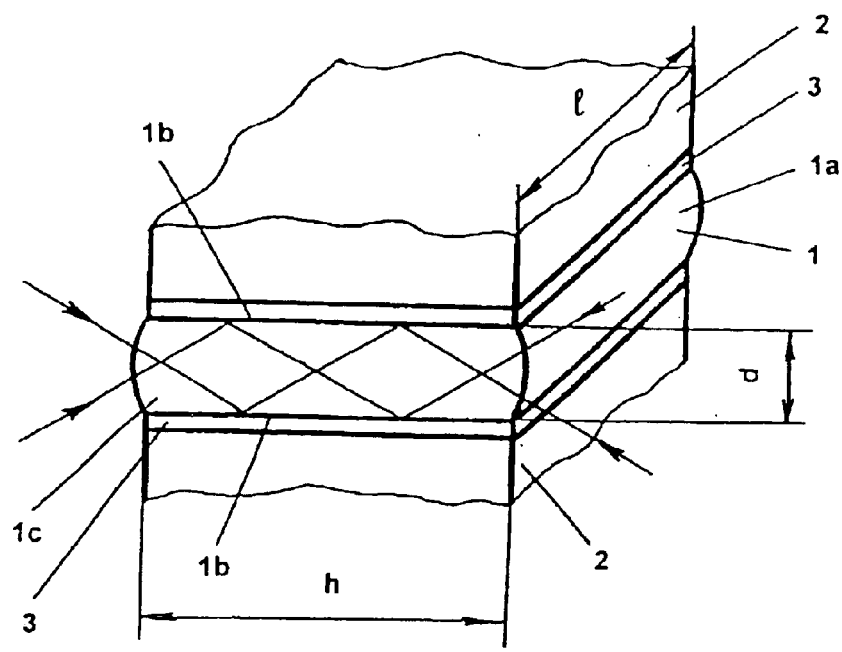
FIG. 1 illustrates a suggested laser module without pump sources.

Referring to FIG. 1, a laser module with optical pumping comprises a solid-state laser slab 1, having a pair of the first opposite lateral (or edge) faces 1a with the distance between them defining a width h of the laser slab, a pair of the second opposite lateral faces 1b with the distance between them defining a thickness d of the laser slab, as well as a pair of opposite end faces 1c with the distance between them defining a length l of a laser slab. The second lateral faces 1b are made flat and parallel to each other for propagation of a laser beam to be output (not shown) along the slab length in a zigzag path while undergoing total internal reflections at the second lateral faces 1b, as in known slab lasers. The first lateral faces 1a are transparent for pump radiation; that is, pump radiation is essentially not diffracted or reflected when passing through these faces into the laser slab. For example, the edge faces 1a can be smoothly polished, and for additional reduction of reflection of pumping light they can be covered with an antireflection coating.

The width h of the laser slab 1 in the laser module shown in FIG. 1 is constant along the length of the slab 1 and exceeds the thickness d. The width of a slab 1 can exceed the thickness, for example, at least 2 times, more preferable at least 3 times, most preferable at least in 4 times.

The laser module also comprises heat removing portion 2 being in thermal contact with each of the second lateral faces 1b for heat removal from the laser slab 1. The heat removing portion 2 can be realized, for example, as plates of heat-conducting metal, which can be equipped with internal channels for flow of a coolant fluid.

In the arrangement shown in FIG. 1 there is the intermediate layer 3 of heat-conducting material located between the second lateral faces 1b of the slab 1 and the corresponding heat removing portion 2. To ensure total internal reflection of the laser radiation to be output and of the pump radiation the material of the layer 3 must have a refraction index which is lower than the refraction index of the material of the slab 1. When total internal reflection occurs both radiations inevitably penetrates into the layer to a depth of the order of the respective wavelength (up to 2 $\mu$m). Therefore, To reduce any losses, the intermediate layer 3 must be transparent for the laser radiation to be output and for the pump radiation (i.e. the material of the intermediate layer 3 must have low absorption at the wavelengths as well as of the pump as of laser radiation). The depth of penetration defines a minimum thickness of the intermediate layer 3.

A maximum thickness of the intermediate layer 3 is limited through the relative distribution of heat resistance in the path of the heat flow, which distribution governs the magnitude of any temperature variations along the section of the laser slab and the thickness of the layer 3. For efficient heat removal it is reasonable that a temperature drop over the thickness of the layer 3 should not exceed the temperature variations inside the slab 1. Thus, the maximum thickness of the layer is defined by the relation $t \leq 0.25(K_l/K)d$, where $K_l$ and $K$ are thermal conductivities of the intermediate layer material and the material of the laser slab, respectively. For example, for typical values of d=1 mm, $K_l$=0.3 W/(m K) and K=10 W/(m K) the maximum allowed thickness of the layer 3 is 7.5 $\mu$m.

To minimize phase distortions arising in reflected laser beam the material of the intermediate layer 3 must be optically uniform-over its full thickness. The material of the layer 3 must have sufficient beam stability to prevent burning and degradation under radiation. This material as well must be plastic to damp all relative shifts of the components caused by temperature variations when there is a difference in their thermal expansion. Further, the material of the layer 3 must have good adhesion to the surfaces of the slab 1 and heat removing portion 2. As a material for fabrication of the intermediate layer 3 for example, a thermoplastic polymer on the base of hetero-organic compounds and complex ethers can be used.

Figure 2A:
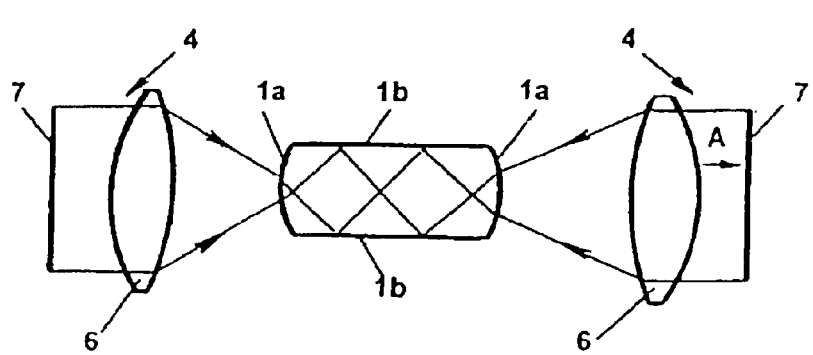
FIG. 2a shows an arrangement of laser diode pump sources with shaping optics for the laser slab in a view from the end of the laser slab.
Figure 2C:
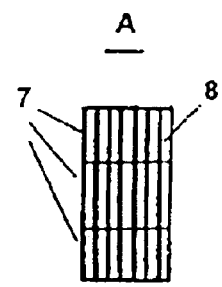
FIG. 2c shows laser diode stacks (the view A in FIG. 2a)
Figure 2B:
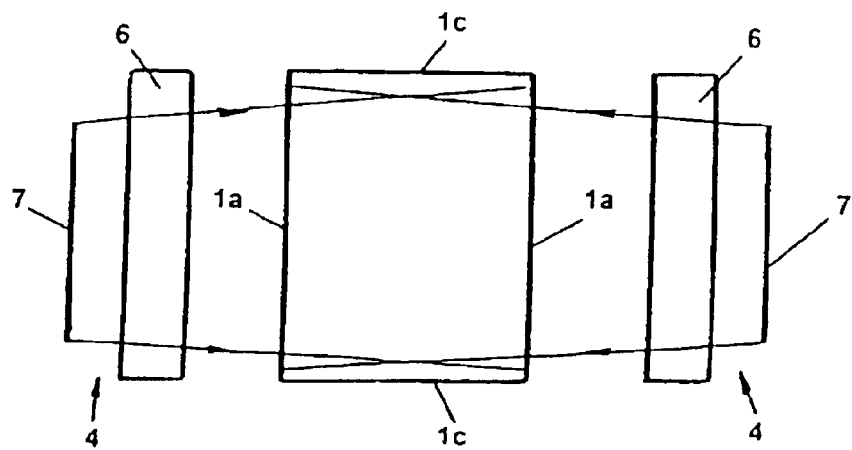
FIG. 2b gives a view of the unit shown in FIG. 2a as viewed from the wide lateral face of the laser slab.
Figure 7A:
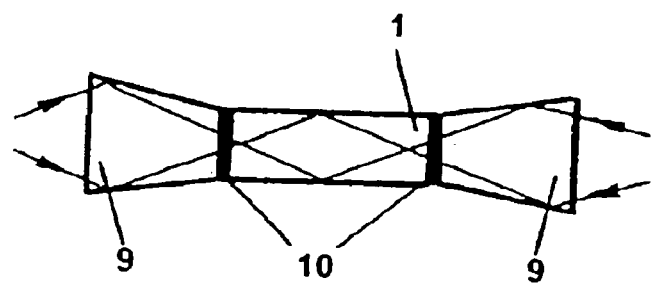
FIG. 7a shows the scheme of laser slab pumping with matching immersion optics in a view from the end face of the laser slab.
Figure 7B:
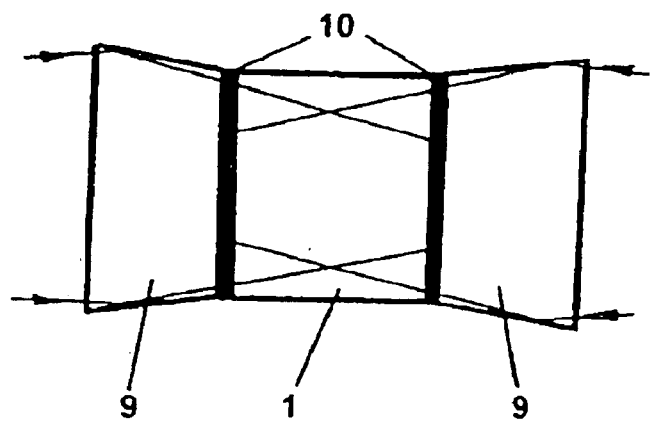
FIG. 7b gives a view of the unit shown in FIG. 7a as viewed from the wide lateral face of the laser slab.
Figure 8A:
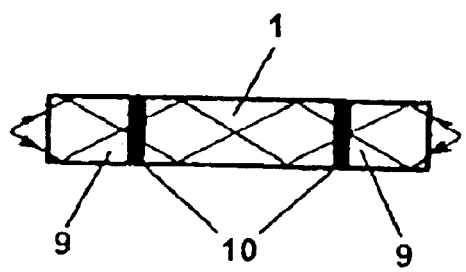
FIG. 8a illustrates one more scheme of laser slab pumping with matching immersion optics in a view from the end face of the laser slab.
Figure 8B:
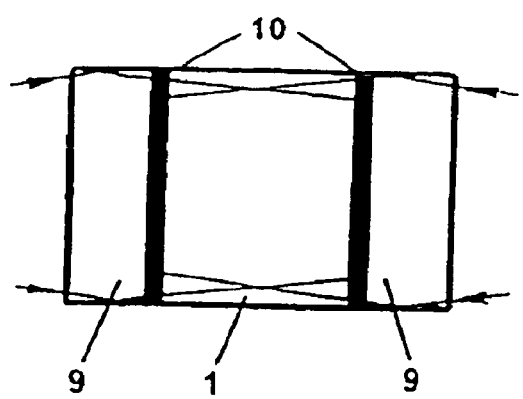
FIG. 8b gives a view of the unit shown in FIG. 8a as viewed from the wide lateral face of the laser slab.

As FIGS. 2a and 2b show, sources 4 for optical pumping can be located near each first lateral face 1a for delivering pump radiation into the slab 1 through the first lateral faces 1a. The pump sources 4 are located symmetrically on both sides of the slab 1. Location of the pump sources 4 (i.e. their orientation with respect to the slab 1 and the distance between the sources 4 and the first lateral faces 1a) and their angular emission characteristics are chosen so that at least a major part of pump radiation having entered the slab 1 propagates inside the slab along the slab width direction in a zigzag path under total internal reflections at the second lateral faces 1b (propagation of the pump light beams is shown by arrows in the drawings).

For example, in the embodiment shown in FIGS. 2a and 2b, the sources 4 for optical pumping are located at a given distance from the first lateral faces 1a and shape the light beams as to converge in the plane of the cross-section of the slab 1, i.e. in a plane that is perpendicular to the lateral faces 1a and 1b under a given angle. Therewith the specified distance and angle are chosen so that the major part of the pump light shaped by the sources 4 passes through the first lateral faces 1a and is incident inside the slab onto the second lateral faces 1b at an angle which provides for total internal reflection (exceeding the critical angle as counted from the normal to the boundary surface of both media).

In another embodiment shown in FIGS. 3a and 3b the sources 4 for optical pumping shape the divergent light properly beams. Thus, as in the unit of FIG. 2 the major part of the pump light shaped by the sources 4, passes through the first lateral faces 1a of a slab 1 and is incident inside the slab onto the lateral faces 1b at an angle which provides for total internal reflection.

In the embodiments shown in FIGS. 2a, 2b and FIGS. 3a, 3b a main axis axial of the pump beam shaped by the pump source 4 is normal to the corresponding first lateral face 1a and parallel to the second lateral faces 1b. At such orientation of the pump sources 4 the zigzag path of the major part of the pump light is provided due to sufficiently large angle of divergence or convergence of the light shaped by the pump sources 4. It is obvious that the maximum value of this angle is limited by the requirements for total internal reflection of pumping light at the lateral faces 1b of the slab 1.

In the module shown in FIG. 4, a plurality of pump sources is placed near each of the first lateral faces 1a with each pump source, as in the unit of FIG. 3a, shaping the divergent light beams. Therewith, reflection of pump radiation at the faces 1b is provided again due to a large angle of divergence of the pump light in the cross-section plane of the laser slab 1.

Unlike the design variants shown in FIGS. 2a, 2b and FIGS. 3a, 3b, in the embodiments shown in FIG. 5 and FIG. 6a, the sources 4 for optical pumping are located so that a main axis of the pump beam shaped by the sources is directed to the corresponding second lateral face 1b inside the slab at the angle of total internal reflection. This enables using in such modules not only sources for optical pumping which produce convergent or divergent beams, but also sources for optical pumping which generate parallel beams. So, for example, the pump sources 4 of FIGS. 5 and 6a form parallel or nearly parallel light beams, wherein at least two pump sources 4 are placed near each of the first lateral faces 1a, being spaced relatively each other along the thickness direction of the slab 1.

In the modules shown in FIGS. 1–3 and 5 the first lateral faces 1a of the slab 1 are made in form of convex surfaces, formed by sectors of a rotation cylinder, with the generatrix along the length of the slab 1 in order to suppress parasitic modes. It is assumed that as shown in FIG. 1 the slab width h is measured for a slab of such a form as the minimum width value.

In order to suppress parasitic oscillations, the first lateral faces 1a of the slab 1 in the module shown in FIG. 4 are made in form of flat surfaces, being inclined to each other as well as to the normal of the plane of the second lateral faces 1b so that the slab 1 has a trapezoid cross-section. The inclination of the first lateral faces 1a relatively to the normal of the plane of the lateral faces 1b is preferably less than 45°. It is also assumed that the width h means for slab of such a form its minimum width value, as shown in FIG. 4.

The sources 4 for optical pumping are preferably laser diode pump sources.

The laser diode pump sources are industrially produced, typically, in the form of individual laser diode arrays (bars) or in the form of laser diode stacks. A laser diode bar is a laser diode with an emitting area having a form of a narrow line (the width $d_l$ of the emitting area is much smaller than the length L of the emitting area). Output beam divergence of an individual laser diode bar has its maximum value (up to 50–80°) in a plane which is orthogonal to the emitting line, and its minimum value (up to about 10°) in a plane containing the linear emitter (laser diode plane).

The pump source 4 shown in FIGS. 3a, 3b which shapes the divergent beam, can be formed by a laser diode bar which has the emitting area extending along the length of the slab 1. At this orientation of the laser diode bar the plane with minimum output beam divergence passes along the length of a slab 1 and thus provides a highly uniform illumination along the length at small losses of pumping radiation near the end faces 1c. Reflection of the major part of pumping radiation at the lateral faces 1b in this situation can be provided without any additional optics due to a large beam divergence (50–80°) in a plane perpendicular to the first lateral faces 1a and 1b, as FIG. 3a shows.

The pump sources 4 shown in FIG. 5 include laser diode bars 5, which have the emitting area extending as well along the length of the slab 1. However, in this case the pump sources are equipped with optical systems for coupling and matching the laser diode bar emitting aperture with the size of the corresponding first lateral face 1a and for shaping the required angular emission characteristics of the pump source 4. As FIG. 5 illustrates, optical systems in form of high-aperture cylindrical lenses 6 provide for an efficient conversion of pump radiation in the plane of maximum divergence into quasiparallel beams. Laser diode sources with built-in cylindrical optics that give the quasiparallel output beam of near rectangular section are industrially produced.

A laser diode stack is a set of laser diode bars, adjoining each other on their planes. The angular emission characteristics of the stack is defined by the angular emission characteristics of each individual laser diode bar, but the near field structure is a result of superposition of radiation of individual bars and thus a mosaic of the linear emitting areas. As FIG. 6b displays the width $d_i$ of the emitting area of the stack 7 is usually assumed to be equal the sum of thicknesses of the composing individual laser diode bars 8, and the length L is the length of the emitting area of each individual diode bar 8. Using sufficiently large numbers of laser diode bars in a stack the width $d_i$ of the emitting area of a stack can be larger than its length L.

The stack 7 having a width of the emitting area which is less than the width of the first lateral face 1a of the laser slab 1, can be installed so that the composing laser diode bars 8 are oriented along the length of the slab 1, for example, as it is shown in FIG. 4.

On the other hand, an orientation of the stack 7 so that its composing laser diode bars 8 are oriented across the length of the slab 1 provides, as shown in FIGS. 6a and 6b for shaping of weakly divergent beams of pump radiation along the slab thickness direction without using any additional optical means. It is obvious that in this case the length L of an emitting area of stack 7 must be chosen according to the thickness d of the laser slab 1.

In the source 4 for pumping, shown in FIGS. 2a–c, the quasi parallel light beam output by the laser diode stacks 7 having the laser diode bars 8 oriented across the length of a slab 1, is converted by the optical system in form of the lenses 6 into a light beam converging in the plane of the slab 1 cross-section. In order to enlarge pump emitting area in such configuration, several stacks with identical orientation of the individual laser diode bars, located next to each other along the thickness direction of the slab 1; for example, three stacks 7, as shown in FIG. 2c can be used.

It should be understood that the laser modules shown in the drawings, are represented only as examples and they do not limit the design of the laser slabs 1 and pumping sources 4.

In the laser unit shown in FIGS. 7a, 7b and FIGS. 8a, 8b, there are provided optical parts in form of extensions which are transparent for pump radiation, in contact with the surface of the corresponding first lateral face 1a through an immersion element 10 and located between the optical pump sources (not shown) and corresponding first lateral faces 1a of the slab 1, which slab has a rectangular cross-section. The specified optical extension 9 and/or the immersion element 10 are made from a material which possesses an absorption sufficient for suppression of parasitic modes at the laser wavelength of the radiation generated or amplified in the laser module. The optical extensions 9 can have, for example, conic (FIGS. 7a, b) or rectangular (FIGS. 8a, b) cross-section. The extensions 9 preferably have a refraction index close to the refraction index of the material of the slab 1. For example, they can be made from the same material as the slab 1, but undoped. Use of such simple optical components for matching of apertures is advantageous in case of small differences between the width of the emitting area of the pumping source and the thickness of the slab 1 (not more than 2 times). The immersion element 10 can be made, for example, from a plastic polymer similar to the material of the intermediate layer 3, but with a higher refraction index close to the refraction index of the material of the slab 1. Selective absorption of laser radiation in the optical extension 9 and/or the immersion element 10 is provided, for example, by including doping ions of rare-earth elements into the composition.

In the embodiment shown in FIG. 9, there is a plate 11 with flat (flatness of optical quality) and parallel opposite surfaces first of which is in contact with an intermediate heat-conducting layer 3, and the second one is coated with an additional intermediate heat-conducting layer 12 contacting the heat removing portion 2. Said plate 11 is located between the intermediate heat-conducting layer 3 and the heat removing portion 2.

When a laser module operates the pump radiation is transmitted from the pump sources 4 into the slab 1 through the first lateral faces 1a. At least the major part of pump radiation being delivered into the slab 1 propagates inside the slab along the slab width direction in a zigzag path while being totally internally reflected at the second lateral faces 1b, usually with several reflections from the opposing second lateral faces 1b. Pump radiation is absorbed by active ions in the slab 1 providing for a population inversion of laser energy levels. When the laser module operates in an amplification mode laser radiation to be amplified, as in known solid-state slab lasers, enters the slab at one of the end faces 1c at such angle relative to the faces 1b as to provide propagation of the laser beam along the slab length in the zigzag path with total internal reflections at the faces 1b. Stimulated light emission by excited ions produces amplification of the laser beam passing through the slab 1. When the laser module shall operate in a generating mode it is placed inside a corresponding optical resonator (not shown) providing positive feedback as it is well known to the person skilled in the art.

Due to the fact that the thickness of the laser slab 1 is less then the width of the slab, the influences of the first lateral faces 1a on any temperature variations in the slab 1 along the thickness direction is reduced. In a preferable case, when the thickness of the slab 1 is at least 4 times less then the width, the temperature effect will be practically negligible over most of the cross-section of the laser slab 1 in its middle part. At the same time, for a specified thickness-to-width ratio of the slab 1, the delivery of pump radiation through the transparent first lateral faces 1a at the given angles and the further zigzag path of the entire pump radiation, or at least of the major part of it, inside the laser slab due to total internal reflections at the lateral faces 1b allows pump radiation distribution in the middle part of the slab 1 being close to uniform along the thickness direction of the slab. The appearance of the local heat overloads and connected with them deformations of the surfaces of a slab 1 is prevented by this uniform distribution.

Due to the absence of the fringe heat effects and due to the uniform distribution of pump radiation along the thickness direction of the slab 1 in the specified middle part of the slab 1 the temperature distribution along this direction will have, as a result of efficient and uniform heat removal from the lateral faces 1b, a bell-shaped form, being in the ideal situation close to a parabolic distribution that allows to output a laser beam with low angular divergence.

Since the first lateral faces 1a of the module are transparent for pump radiation and not light-diffusing, the fraction of pump radiation which enters the laser slab through the first lateral faces is increased and thereby pump efficiency and output power of the module are raised.

The zigzag path of the major part of pump radiation inside the slab 1 provides for an increased path length through the laser medium. Due to this fact pump radiation losses, connected with its passing through the slab 1, decrease particularly in the embodiments of FIGS. 5 and 6a, where a zigzag path is provided for all pump radiation entered into the slab 1. This increases pump efficiency and allows gain media with lower dopant concentration and smaller stimulated emission cross-section σ, which gain media are usually preferable for high power pulsed lasers.

Using several pump sources 4, each located near the first lateral face 1a, allows to increase the total pump power and to improve uniformity of pump radiation distribution over the slab volume and thus increases the output power of laser radiation and reduction of angular beam divergence.

The cylindrical form of the first lateral faces 1a in the modules illustrated in FIGS. 1, 2a, 3a, 5, 6a, extends the range of angles of incidence of pump light, while still satisfying conditions of total internal reflection. Besides, cylindrical surfaces prevent appearance of closed beam trajectories in a laser slab section and thereby prevent excitation of parasitic modes.

In the unit shown in FIG. 4, parasitic mode suppression is obtained through inclination of the first lateral faces 1a towards each other and relative to the normal to the plane of the second lateral faces 1b.

In the modules shown in FIGS. 7a, 7b and 8a, 8b, parasitic mode suppression is provided due to the fact that the optical extension 9 and/or the immersion element 10 are made of material possessing sufficient absorption at the wavelength of the output laser radiation.

The intermediate layer 3 of thermoplastic polymer on the base of hetero-organic compounds and complex ethers ensure a reliable heat contact between the slab 1 and heat removing portion 2, as well as facilitate their mechanical connection due to good adhesion. At the same time high transparency of such polymer and its low refraction index assist to provide the zigzag path of laser radiation to be output and of pump light inside the slab 1 with small losses.

Unevenness of metallic surface of the heat removing portion 2, obtained when processing and being commensurable with the thickness of the intermediate layer 3, cause local nonuniformities in the thickness of this layer 3 and result in local temperature micro-nonuniformities over the second lateral surface 1b of the slab. It turned out that these micro-nonuniformities affect the reflection parameters and transverse intensity distribution in the output laser beam. Using additional optically smooth plates 11 between the intermediate heat conducting layer 3 and the heat removing portion 2 allow to reduce said temperature micro-nonuniformities and thereby to improve a profile of the output laser beam.

Experimental studies of the suggested modules have been carried out in the operation modes of lasing (generating) and amplifying.

In one experimentally realized module a Nd:YAG laser slab with dimensions of 1×5×48 mm$^3$ was used. The surfaces were polished, and the narrow first lateral faces were slightly tilted respectively each other, as shown in FIG. 4, for suppression of parasitic modes. For realization of the heat removing portion the wide second lateral flat faces of the laser slab contacted the surfaces of metallic plates of aluminum alloy through intermediate polymeric layers having a refraction index of 1.42. The thickness of these layers was of about 5–10 μm. The polymeric layers were stable against pump radiation with power densities of up to 2 kW/cm$^2$.

Pumping was carried out through the first lateral flat faces of the slab by four laser diodes model JOLD-200-QANC-2L, of JENOPTIK Laserdiode GmbH, Germany, with a total average output power of up to 60 W at the wavelength 808 nm under the scheme shown in FIG. 6. An area of 20 mm in length along the slab length was irradiated.

A length of a stable resonator was 120 mm.

Using an average pump power of 45 W, a pump pulse duration of 300 μs, and a repetition rate of 600 Hz resulted in an average laser output power of about 7.5 W, i.e. optical conversion efficiency of the pump radiation was about 17%. Beam divergence along the slab thickness direction appeared to be close to diffraction limit (of about 2.5 mrad) and practically had no dependence on pulse repetition rate indicating high efficiency and uniformity of heat removal from the laser slab through polymeric layers.

Regarding the performance of this module in amplification mode CW input laser radiation with a power of 5 mW was delivered to the end face of the laser slab in its middle part. The diameter of the input beam was of 0.8 mm. Pumping was in pulse-repetition regime (QCW) at a pulse repetition rate of 50 Hz and a pulse duration of 1.3 msec. At a peak pump power of about 300 W the amplification index was of about 0.4 cm$^{-1}$. In a similar module, but without means to suppress parasitic modes (the slab had a rectangular cross-section) this index, at identical conditions, did not exceed 0.1 cm$^{-1}$ owing to a stored energy decrease by oscillation of parasitic modes.

In a further experimental realization of the module the Nd:YAG laser slab had dimensions of 1×5×12 mm$^3$. For suppression of parasitic modes the immersion optics according to FIGS. 7a, 7b was used. The pump sources were laser diode bars with built-in cylindrical collimation lenses with a width of the emitting area of 1.2 mm; the laser slab was pumped by four of such sources according to FIG. 5. The total average pump power was 120 W. Heat removing portion with internal channels for coolant flow were made of aluminum alloy. The thickness of intermediate polymeric layer was of about 5–10 μm. An external system of mirrors provided multiple passing of the amplified radiation along the slab length with the beam axis shift from pass to pass in the width direction of the slab. The result and amplifier module was capable to amplify radiation power approximately in 20 times at an input power of 2 W.

The heat flow through the intermediate polymeric layer in this module was approximately 40 W/cm$^2$. For removal of this heat it is sufficient to run water through the internal channels at a flow rate of about 10 ml/sec. In this experiment the water gets heated approximately by 20° C., cross-sectional temperature variations in the laser slab were at 14° C., and the temperature drop in the polymeric layer was from 6.5 to 13° C.

Improvement of uniformity of temperature distribution over the wide second lateral faces of the laser slab in experimentally studied modules was achieved by the use of additional smoothly polished plates 11 made from heat conducting material and placed between intermediate heat-conducting layer 3 and heat removing portion 2, as shown in FIG. 9. Thermal contact of the plate 11 with the surface of the heat removing portion 2 was provided by means of additional intermediate heat-conducting layer 12 with properties similar to those of the intermediate layer 3. Improvement of far field distribution of laser radiation, which was achieved in this case, is obvious from the comparison of FIGS. 10a and 10b, where the field patterns are presented for the laser modules without and with additional plates 11, respectively.

What is claimed is:

1. An optically pumped laser module comprising:
   sources for optical pumping,
   a solid-state gain element in form of a slab having a pair of end faces with the distance between them defining the length of the slab,
   a pair of first opposite lateral faces adapted to deliver pump radiation through them from the pumping sources into the laser medium and which are spaced at a distance defining a width of the slab,
   a pair of second opposite lateral faces which are plane-parallel for direction of a laser beam to be output such so that the beam propagates along the slab length in a zigzag path, undergoing total internal reflections at the second lateral faces and with the distance between the second lateral faces defining a thickness of the slab, and
   heat-removing portion being in a heat contact with each of the second lateral faces for heat removal from the slab,
   wherein the width of the slab exceeds its thickness,
   the first lateral faces are transparent for pump radiation, and the
   location of the sources for optical pumping relative to the slab as well as the angular emission characteristics of the sources for optical pumping are so that at least a major part of pump radiation propagates inside the laser slab along the width of the slab in a zigzag path while being totally internal reflected at the second lateral faces.

2. A laser module according to claim 1, wherein the width of a laser slab exceeds the thickness of the laser slab at least 4 times.

3. A laser module according to claim 1, wherein the sources for optical pumping shape a light beam to converge or diverge in a plane perpendicular to the first and the second lateral faces so that at least a major part of this beam passing through the first lateral faces, is incident onto the second lateral faces inside the slab at an angle sufficient for total internal reflection.

4. A laser module according to claim 1, wherein the sources for optical pumping are oriented so that main axis of the beam shaped by the pump source is directed onto the inner side of the corresponding second lateral face at an angle sufficient for total internal reflection.

5. A laser module according to claim 1, wherein the first lateral faces of the laser slab are convex surfaces formed by parts of a rotation cylinder with the generatrix passing along the length of a laser slab.

6. A laser module according to claim 1, wherein the first lateral faces of the laser slab are flat surfaces inclined towards each other and relatively to the normal of a plane of the second lateral faces.

7. A laser module according to claim 6, wherein the first lateral faces of the laser slab are inclined towards each other by an angle less than 45 degrees relatively to the normal of the plane of the second lateral faces.

8. A laser module according to claim 1, wherein between each of the optical pump sources and the appropriate first lateral face of the laser slab there is placed a optical extension being transparent for pumping radiation and in contact with the surface of the corresponding first lateral face through an immersion element, with the optical extension or the immersion element being constructed of material that absorbs at the wavelength of said laser beam in a manner sufficient for suppression of parasitic modes in the laser slab.

9. A laser module according to any claim 1, wherein the sources for optical pumping are laser diode pump sources.

10. A laser module according to claim 9, wherein the laser diode pump source comprise at least one laser diode bar oriented along the length of the laser slab.

11. A laser module according to claim 9, wherein the laser diode pump source comprise at least one row of laser diode bars oriented transverse the length of the laser slab.

12. A laser module according to claim 9, wherein each of the laser diode pump sources is equipped by an optical system adapted to match the emitting aperture of the laser diode pump source to the size of the corresponding first lateral face, and to shape the required angular emission characteristics of the said pump sources.

13. A laser module according to claim 1, wherein between the second lateral faces of the laser slab and corresponding heat removing portion there is placed an intermediate layer which is optically uniform and transparent both to laser and pump radiations and which is made from a plastic heat-conducting material having a refractive index less than the refractive index of the laser slab material and a thickness which does not exceed $0.25(K_f/K)d$, where $K_f$ and $K$ are heat conductivities of the intermediate layer material and the material of a laser slab, respectively.

14. A laser module according to claim 13, wherein the intermediate layer is made of thermoplastic polymer on the base of hetero-organic compounds and complex ethers.

15. A laser module according to claim 13, wherein between the intermediate heat conducting layer and heat removing portion there is additionally placed a plate that has plane-parallel opposite surfaces the first of them being in contact with the intermediate heat conducting layer and the second one being coated with an additional intermediate heat-conducting layer and being in contact with the heat removing portion.

16. An optically pumped laser module comprising:

sources for optical pumping, a solid-state gain element in form of a slab having a pair of end faces with the distance between them defining the length of the slab, a pair of first opposite lateral faces adapted to deliver pump radiation through them from the pumping sources into the laser medium and which are spaced at a distance defining a width of the slab, a pair of second opposite lateral faces which are plane-parallel for direction of a laser beam to be output such so that the beam propagates along the slab length in a zigzag path, undergoing total internal reflections at the second lateral faces and with the distance between the second lateral faces defining a thickness of the slab, and wherein the width of the slab exceeds its thickness, the first lateral faces are transparent for pump radiation, and the location of the sources for optical pumping relative to the slab as well as the angular emission characteristics of the sources for optical pumping are so that at least a major part of pump radiation propagates inside the laser slab along the width of the slab in a zigzag path while being totally internal reflected at the second lateral faces.

17. The laser module of claim 16 further comprising a plurality of a means for removing heat being in a heat contact with each of the second lateral faces for heat removal from the slab.

18. An optically pumped laser module comprising:

sources for optical pumping, a solid-state gain element in form of a slab having a pair of end faces with the distance between them defining the length of the slab, a pair of first opposite lateral faces adapted to deliver pump radiation through them from the pumping sources into the laser medium and which are spaced at a distance defining a width of the slab, a pair of second opposite lateral faces which are plane-parallel for direction of a laser beam to be output such so that the beam propagates along the slab length in a zigzag path, undergoing total internal reflections at the second lateral faces and with the distance between the second lateral faces defining a thickness of the slab, and a pair of heat-removing portions, each being in a heat contact with respective ones of the pair of second lateral faces for heat removal from the slab, the first lateral faces are transparent for pump radiation, and the location of the sources for optical pumping relative to the slab as well as the angular emission characteristics of the sources for optical pumping are so that at least a major part of pump radiation propagates inside the laser slab along the width of the slab in a zigzag path while being totally internal reflected at the second lateral faces.

19. The laser module of claim 18 further wherein the width of the slab exceeds its thickness.

20. A laser module according to claim 18, wherein each of the laser diode pump sources is equipped by an optical system adapted to match the emitting aperture of the laser diode pump source to the size of the corresponding first lateral face, and to shape the required angular emission characteristics of the said pump sources.

* * * * *